United States Patent [19]

Yoshida et al.

[11] Patent Number: 4,910,506
[45] Date of Patent: Mar. 20, 1990

[54] DATA COMMUNICATION APPARATUS

[75] Inventors: Takehiro Yoshida; Yasuhiro Murayama, both of Tokyo, Japan

[73] Assignee: Canon Kabushiki Kaisha, Tokyo, Japan

[21] Appl. No.: 161,231

[22] Filed: Feb. 17, 1988

Related U.S. Application Data

[63] Continuation of Ser. No. 800,392, Nov. 21, 1985, abandoned.

[30] Foreign Application Priority Data

| Nov. 28, 1984 | [JP] | Japan | 59-250875 |
| Dec. 24, 1984 | [JP] | Japan | 59-272371 |
| Dec. 24, 1984 | [JP] | Japan | 59-272372 |
| Dec. 25, 1984 | [JP] | Japan | 59-275551 |

[51] Int. Cl.$^4$ .............................................. H04D 5/00
[52] U.S. Cl. ........................... 340/825.07; 340/825.51; 340/825.52; 358/400
[58] Field of Search ............... 340/825.51, 825.52, 340/825.5, 825.06, 825.07; 379/100, 92; 375/8, 121; 370/110.1; 358/256

[56] References Cited

U.S. PATENT DOCUMENTS

| 4,271,470 | 6/1981 | Dlugos et al. | 340/825.07 |
| 4,491,873 | 1/1985 | Takayama | 358/256 |
| 4,583,124 | 4/1986 | Tsuji et al. | 358/256 |
| 4,652,933 | 3/1987 | Koshiishi | 358/256 |
| 4,710,951 | 12/1987 | Itezono | 379/100 |
| 4,727,429 | 2/1988 | Veno | 358/256 |

FOREIGN PATENT DOCUMENTS

| 8502963 | 7/1985 | European Pat. Off. |
| 8503147 | 7/1985 | European Pat. Off. |
| 1372071 | 10/1974 | United Kingdom |
| 1487483 | 9/1977 | United Kingdom |
| 2022373 | 12/1979 | United Kingdom |
| 2034559 | 6/1980 | United Kingdom |

OTHER PUBLICATIONS

CCITT Recommendation T.30, "Procedures for Document Facsimile Transmission in the General Switched Telephone Network", pp. 69, 102–104.

Primary Examiner—Robert L. Griffin
Assistant Examiner—Ralph E. Smith
Attorney, Agent, or Firm—Fitzpatrick, Cella, Harper & Scinto

[57] ABSTRACT

A data communication apparatus comprises means for registering a destination station identification code number, means for storing information, and control means for setting a communication mode by the destination station identification code registration means and the information storing means.

11 Claims, 21 Drawing Sheets

FIG. 2

| A | B | $C_1$ | $C_2$ | $C_3$ | C |
|---|---|---|---|---|---|
| 0 0 0 0 1 | 03 - 123 - 4567 | 1 | 0 | 1 | 1 ----- |
| 0 0 0 1 0 | 03 - 123 - 5678 | 1 | 1 | 1 | 0 ----- |
| 0 0 0 1 1 | 03 - 123 - 4653 | 0 | 0 | 0 | 0 ----- |
| | | | | | |
| LAST ADDRESS | | | | | ----- |

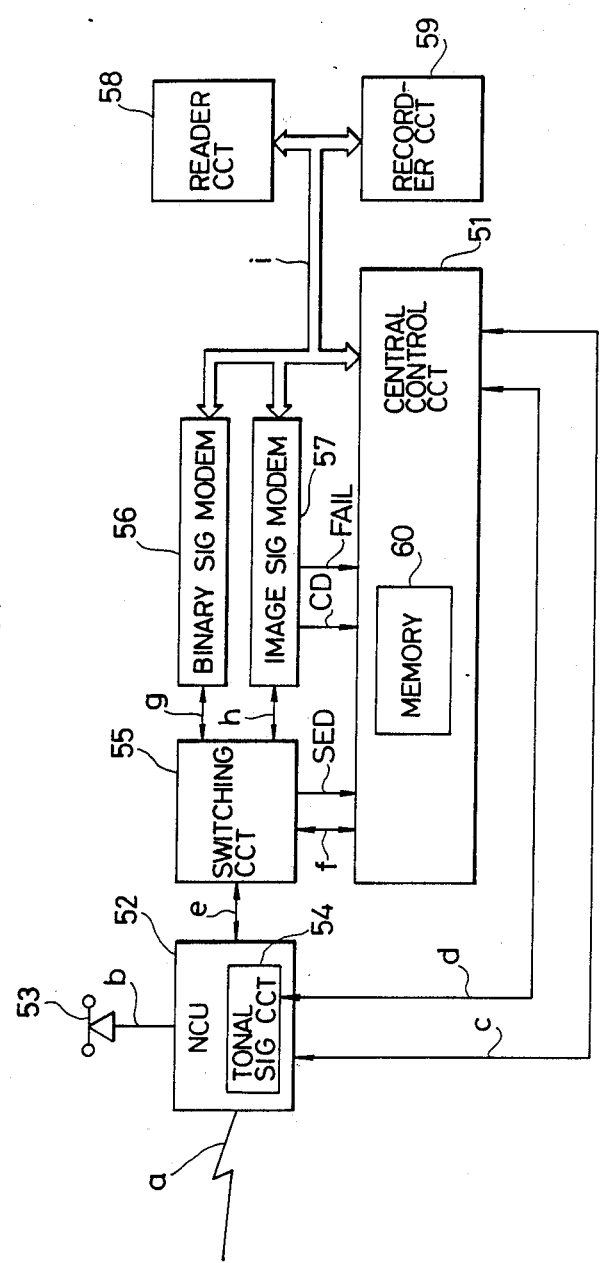

DATA COMMUNICATION APPARATUS

This application is a continuation of application Ser. No. 800,392, filed Nov. 21, 1985, now abandoned.

BACKGROUND OF THE INVENTION

1. Field of the Invention

The present invention relates to a data communication apparatus for communicating data.

2. Description of the Prior Art

In a prior art apparatus of this type such as a facsimile machine, transmission in a high speed mode is not possible because of line conditions at the destination station. Since the transmission is, in many cases, attained in a low speed mode under such circumstances, the transmission in the low speed mode is carried out by an automatic fall-back function. In the transmission by the automatic fall-back, however, the protocol time is long and the fall-back is not certain.

If the destination station has no facsimile machine, it is not possible to register a telephone number of the destination station to a telephone number registration means at the destination station and communicate by calling by a shortened dialing number or a one-touch key of the facsimile machine.

When the facsimile apparatus has the telephone number registration means for the destination stations to automatically call the destination telephone numbers and broadcast a message to a plurality of destination stations, the transmission in only one mode is permitted.

In the past, the facsimile communication protocol followed the "Protocol for Document Facsimile Transmission in the General Switched Telephone Network" of the CCITT Recommendation T.30.

The protocols in multi-page transmission/reception in accordance with the Recommendation T.30 are explained for a past-protocol of the last document and a protocol in a transmission speed fall-back with and without mode change.

FIG. 4A shows a facsimile communication protocol without mode change. In FIG. 4A, after a sending station detects a confirmation for reception ready (CFR) signal 11a, it sends a training signal (12a) and then sends a first page of an image signal (13a). After the transmission of the image signal, it sends an end of image (RTC) signal (15a). The RTC signal comprises six continuous EOL's (each of which comprises 11 "0"s and one "1", 000...001) and informs to the receiving station of the end of the image signal. The RTC signal is transmitted at the same transmission speed as the image signal. On the other hand, the receiving station detects the RTC signal following to the image signal (16a) to detect the end of the image signal and waits for protocol signals. If a next document is to be transmitted without the mode change, the sending station sends a multi-page (MPS) signal (17a) after the transmission of the RTC signal to inform the receiving station that it will send the image signal of the next document in the same mode as the previous image signal. The receiving station detects the MPS signal (18a) and when it detects reception ready status for the next document, it sends a message acknowledged (MCF) signal (19a) to inform to the sending station that the previous document image signal has been received, and waits for the next image signal. The sending station detects the MCF (20a), and when it is ready to send the next document, it sends a training signal (21a) and starts to send the second image signal (22a) as was done for the first image signal. The above operation is repeated so long as the document to be transmitted exists. The protocol before the transmission of the first image signal is not explained here because it has no direct relation to the present invention.

FIG. 4B shows a communication protocol when a mode change is included. In FIG. 4B, the protocol up to the detection (11b) of the CFR signal from the receiving station to the sending station and the transmission of first image signal is similar to the protocol up to 11a in FIG. 4A. After the transmission of the first image signal, the RTC signal is sent (15b). If the mode change is required, an end of message (EOM) signal is sent (17b) to inform the receiving station to receive the second document in a different mode than the mode in which the first document was received. The receiving station sends the MCF signal (19b) after it detects the EOM signal (18b). In accordance with the Recommendation T.30, the receiving station sends a DIS signal six seconds after it sends the MCF signal to tell the function of the receiving station to the sending station (21b). The sending station detects the DIS signal (22b) and sends a DCS signal (23b) to tell the mode for the second document to the receiving station. The receiving station detects the DCS signal (24b) to recognize the mode for the second document, checks the training of the modem by the following training (TCF) signal, and if the training is correct, sends the CFR signal (27B) and receives the image signal. The sending station detects the image signal reception ready status of the receiving station by the CFR signal (28b) and sends the image signal (30b).

FIG. 4C shows a communication protocol after the last document. After the sending station sends the image signal of the last document (1c), it sends the RTC signal (3c) and an end of protocol (EOP) signal (5c) to tell to the receiving station the last document. The receiving station detects the EOP signal (6c) to detect that it is the last document, and sends the MCF signal (7c) and waits for the DCN signal. After the sending station detects the MCF signal (8c), it sends a digital command (DCN) signal (9c) to switch the line from the facsimile machine to the telephone set. Thus, one communication cycle terminates (11c). Similarly, the receiving station detects the DCN signal (10c) and switches the line to the telephone set. Thus, one communication cycle terminates (12c).

FIG. 4D shows a communication protocol of a transmission speed fall-back. After the first image signal is sent, the sending station sends the RTC signal and an MPS/EOM signal (15d). The receiving station checks an image quality (7d), and if the image quality is poor, it sends a rejection of training (RTN) signal instead of the MCF signal to tell to the sending station that the current document image was not correctly received (8d). The sending station detects the RTN and the DCS signal (11d) again to decrease the transmission speed of the next document image signal from that of the previous document. It also sends a training TCF signal (13d) to tell to the receiving station that the transmission speed has been changed and to check the modem training in the receiving station. If the check in the receiving station is acceptable, the receiving station sends the CFR signal and receives the next document image signal (15d).

The facsimile communication system in accordance with the T.30 Recommendation requires lengthy protocol time. Accordingly, communication cost is high when a number of documents are to be transmitted or when the transmission is to be done to a distant place.

SUMMARY OF THE INVENTION

It is an object of the present invention to remove the drawbacks of the prior art as abovementioned.

It is another object of the present invention to provide an improved data communication apparatus which resolves defects in the prior art apparatus.

It is another object of the present invention to provide a data communication apparatus which reduces communication protocol time and a communication cost.

It is another object of the present invention to provide a data communication apparatus capable of communicating data in accordance with a destination station.

It is another object of the present invention to provide a data communication apparatus which can simplify a communication protocol by presetting a communication mode.

It is another object of the present invention to provide a data communication apparatus which can reduce a communication protocol time by switching between a first modem for demodulating an image signal and a second modem for demodulating a communication protocol control signal by control means when the communication protocol control signal is applied.

It is another object of the present invention to provide a data communication apparatus which simplifies communication protocol by not switching from a first modem for demodulating an image signal to a second modem for demodulating a communication protocol control signal in a protocol between documents when a plurality of documents are to be transmitted in one communication mode.

It is another object of the present invention to provide a data communication apparatus which simplifies an image communication protocol by setting a communication mode in accordance with prestored destination information when a communication mode is to be changed depending on a quality of a transmitted image.

Other objects of the present invention will be apparent from the following description of the invention and the appended claims.

BRIEF DESCRIPTION OF THE DRAWINGS

FIG. 2 shows registered information stored in a RAM 19 of FIG. 1, FIGS. 3A-3E are flow charts showing an operation of a control circuit 1 of FIG. 1, FIG. 5 is a block diagram of a second embodiment.

DETAILED DESCRIPTION OF THE PREFERRED EMBODIMENTS

In the description of the embodiments of the present invention, G III machines in accordance with the CCITT Recommendation T4 are explained.

Figure 1:
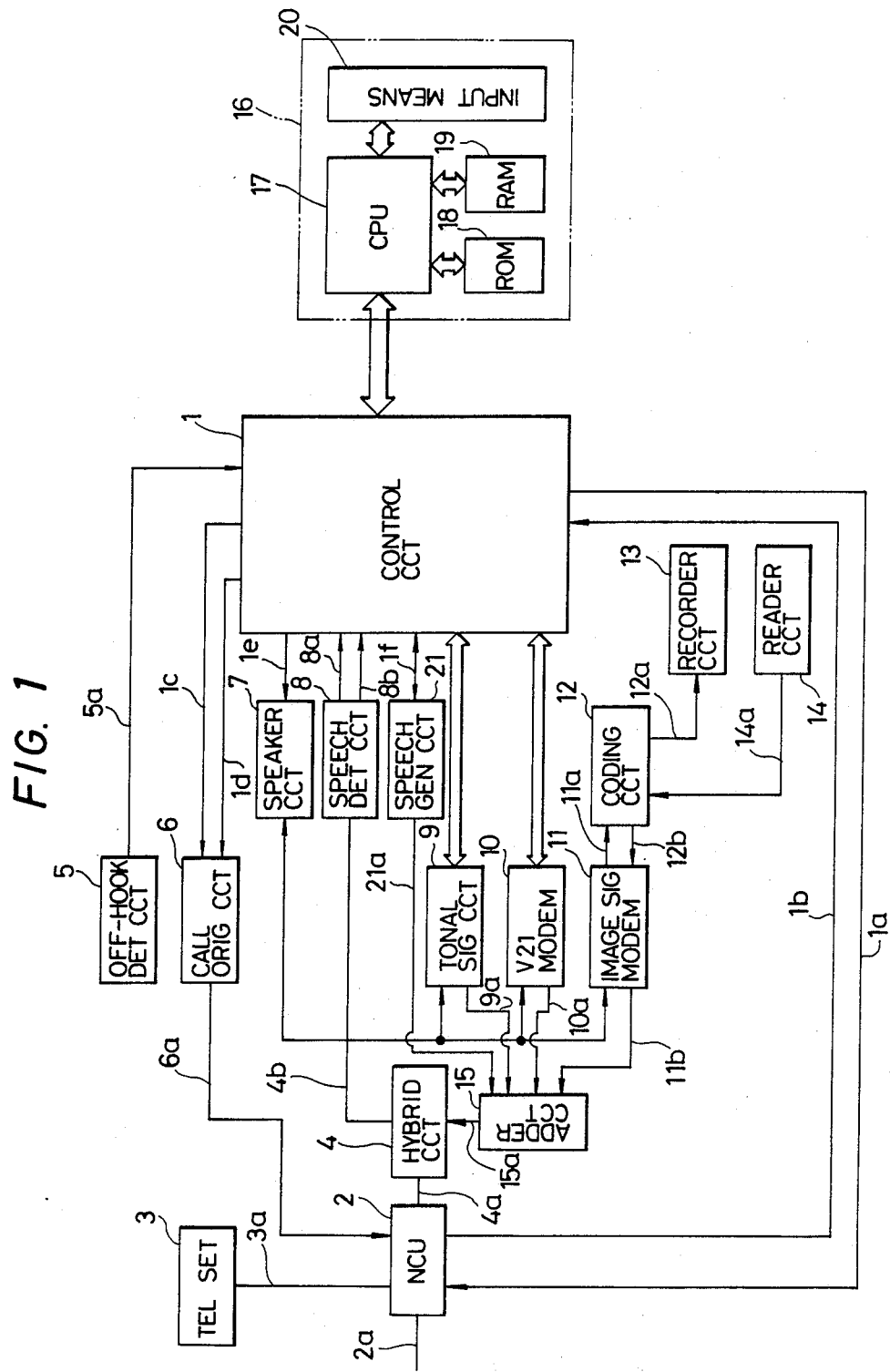
FIG. 1 is a block diagram showing an overall configuration of a first embodiment of a facsimile machine.
Figure 3A:
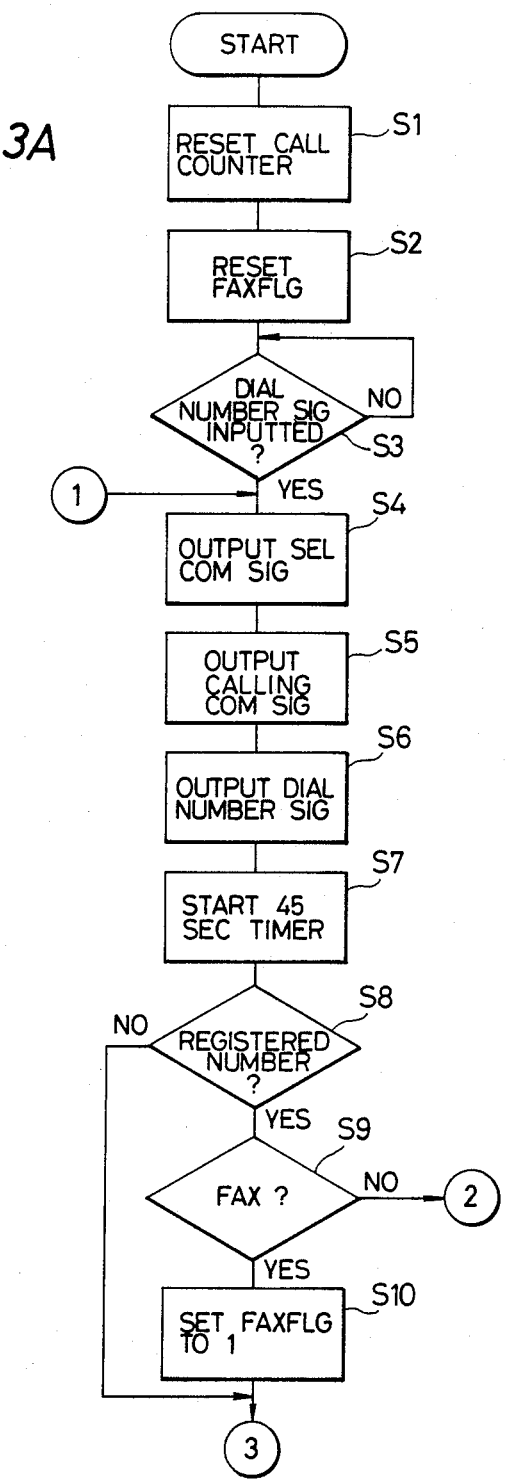
Figure 3B:
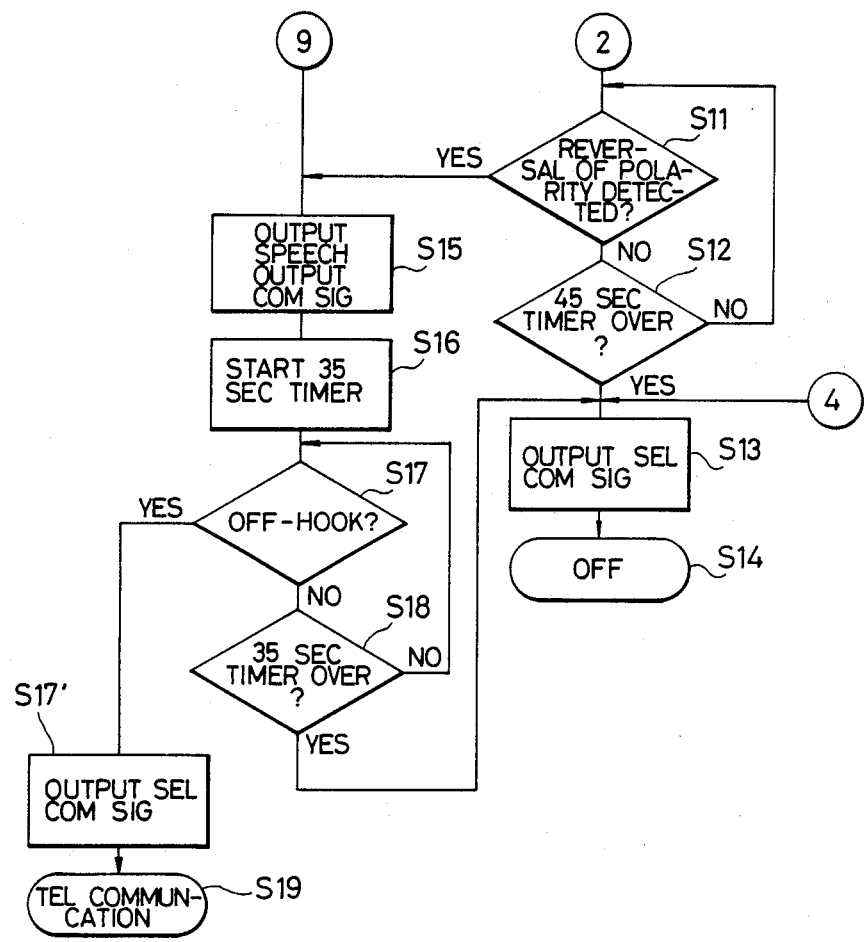
Figure 3C:
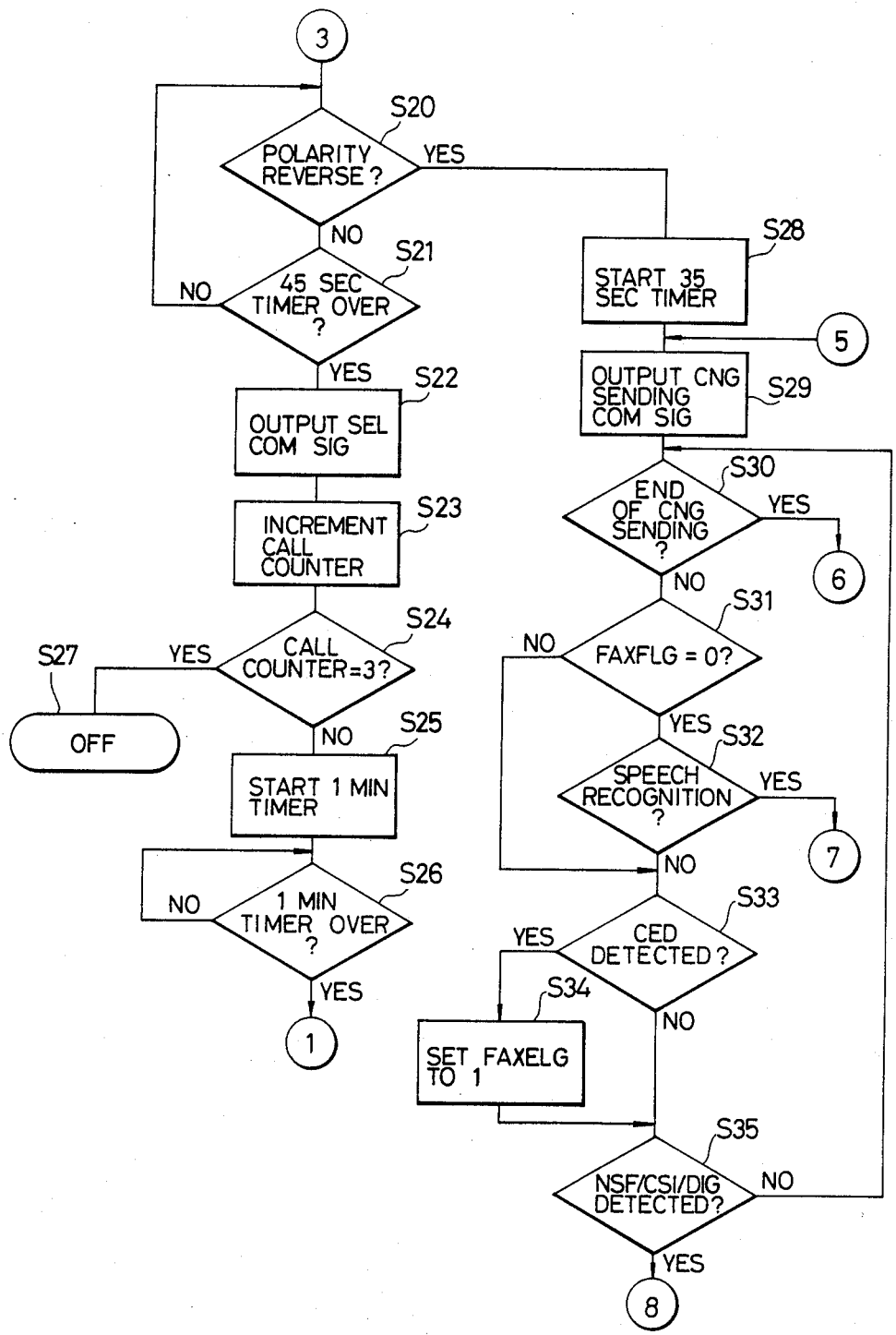
Figure 3D:
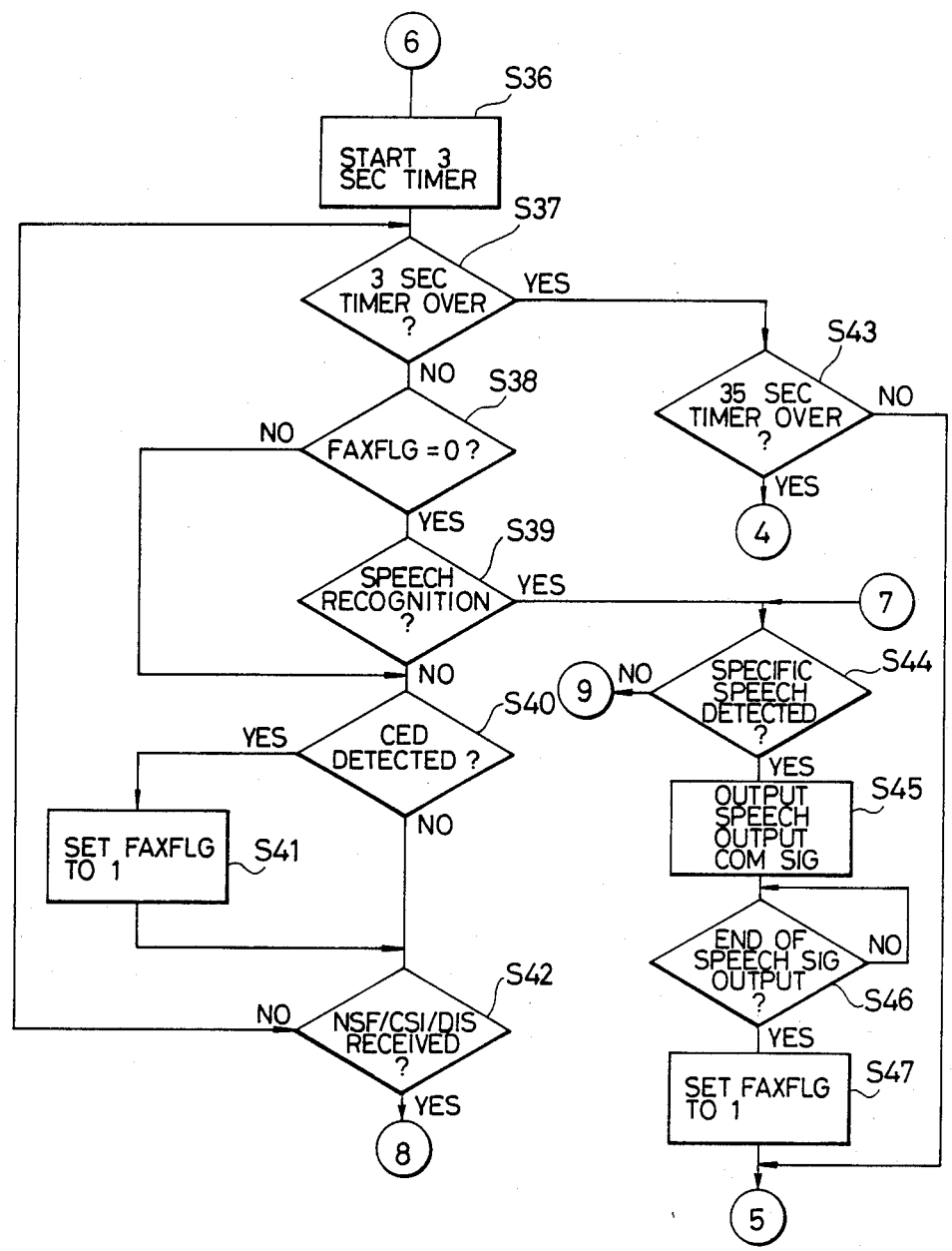
Figure 3E:
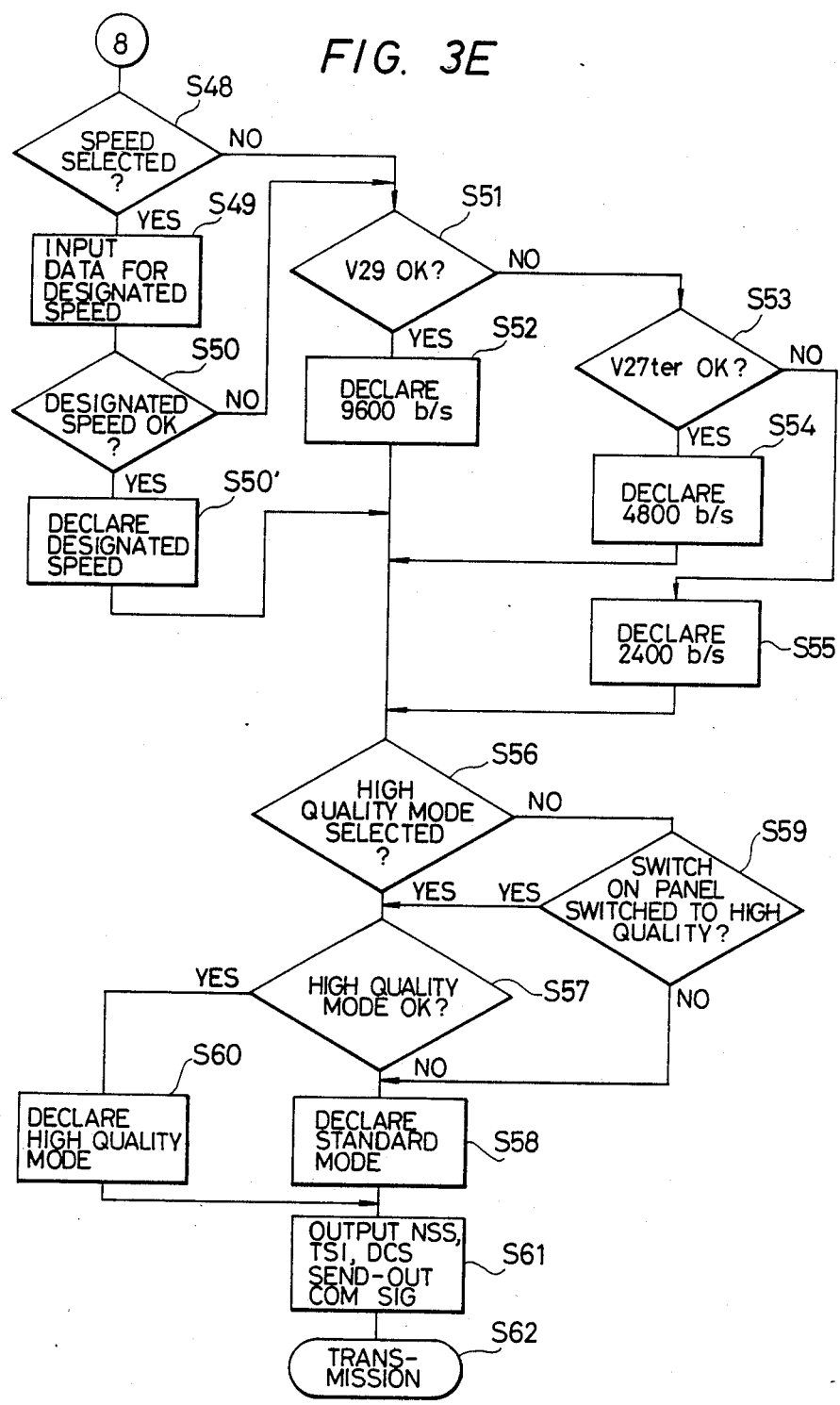

FIG. 1 is a block diagram showing an overall configuration of a first embodiment of the present invention.

Numeral 1 denotes a control circuit to control the entire apparatus. It comprises a microcomputer and peripheral devices such as a ROM and a RAM. Numeral 2 denotes a network control unit (NCU) which switches a telephone line to a facsimile machine or a telephone set and maintain a loop of the telephone line. The telephone line 2a is normally connected to the telephone set 3, and when a switching command signal is applied to the NCU 2 through a signal line 1a, the telephone line 2a is connected to a hybrid circuit 4. When the switching command signal is applied to the NCU 2 by the control circuit 1 while the telephone line 2a is connected to the hybrid circuit 4, the telephone line 2a is connected to the telephone set 3. When the telephone line 2a is connected to the telephone set, the NCU 2 detect a polarity reversal and supplies a polarity reversal detection signal to the control circuit 1 through a signal line 2b. The hybrid circuit 4 separates a sending signal from a receiving signal. The sending signal is supplied to the hybrid circuit 4 through a signal line 15a and sent to the telephone line 2a through a signal line 4a and the NCU 2. The receiving signal is supplied to the hybrid circuit 4 through the signal line 4a to the hybrid circuit 4 and sent to a signal line 4b.

Numeral 5 denotes an off-hook detection circuit which detects an off-hook and supplies an off-hook detection signal to the control circuit 1 through a signal line 5a. Numeral 6 denotes a calling circuit. When a call command signal is supplied to the calling circuit 6 by the control circuit 1 through a signal line 1c, a DC circuit of the calling circuit is closed. The calling circuit 6 then receives a dialing digit code supplied from the control circuit 1 through a signal line 1d and calls through a signal line 6a and the NCU 2. Numeral 7 denotes a speaker circuit. When a speech output command signal is supplied to the speaker circuit 7 from the control circuit 1 through a signal line 1e, the speaker circuit 7 sends out a speech signal received through telephone line 2a, NCU 2, hybrid circuit 4 and signal line 4b.

Numeral 8 denotes a speech detection circuit. When the signal received through the telephone line 2a, NCU 2, hybrid circuit 4 and signal line 4b is a speech signal, the speech detection circuit 8 outputs a speech recognition signal to the control circuit 1 through a signal line 8a. If the speech detection circuit 8 recognizes that the received signal is a specific speech signal such as "facsimile" or "fax", it outputs a specific speech detection signal to the control circuit 1 through a signal line 8b.

Numeral 9 denotes a tonal signal circuit which receives and sends a tonal signal. Since the tonal signal is well known by the CCITT Recommendation T Series, only the signals which relate to the present embodiment are explained here. When the tonal signal circuit 9 receives a called station identification (CED) signal which is one of the tonal signals, it sends a CED detection signal to the control circuit 1. When a calling tone (CNG) signal output command signal is applied to the tonal signal circuit 9 from the control circuit 1, the tonal signal circuit 9 sends a CNG signal to a destination equipment through signal line 9a, adder circuit 15, hybrid circuit 4, NCU 2 and telephone line 2a.

Numeral 10 denotes a V21 modem which modulates and demodulates the control signal and transmits and receives it. Since the V21 modem has been well known, only the control signals which relate to the present embodiment are explained. When the V21 modem 10 receives non-standard facility (NSF) signal, called subscriber identification (CSI) signal or digital identification (DIS) signal, it outputs NSF detection signal, CSI detection signal and DIS detection signal, respectively, to the control circuit 1 and also supplies to the control circuit 1 information of a facsimile information field (FIF) of the DIS signal such as a data transmission speed and the presence or absence of a high quality mode. When non-standard facility set-up (NSS) signal transmission command signal, transmitting subscriber identification (TSI) signal transmission command signal or digital command (DCS) signal transmission command, which commands transmission of the NSS, TSI or DCS signal, respectively, is supplied to the V21 modem 10 from the control circuit 1, the V21 modem 10 sends the NSS, TSI or DCS signal to the destination equipment through the signal line 10a, adder circuit 15, hybrid circuit 4, NCU 2 and telephone line 2a. The information from the control circuit 1 such as the data transmission speed or the presence or absence of the high quality mode is supplied to the FIF field of the DCS signal.

Numeral 11 denotes an image signal modem which modulates and demodulates an image signal. In the present embodiment, the image signal modem 11 comprises a V27 ter modem having a transmission speed of 4800 b/s and a V29 modem having a transmission speed of 9600 b/s. One of the V27 ter modem and the V29 modem is selected by a modem selection signal supplied from the control circuit 1 through a signal line (not shown).

Numeral 12 denotes a coding circuit which decodes and encodes the image signal. Numeral 13 denotes a record circuit which records the received image signal. Numeral 14 denotes a read circuit which reads a document to be transmitted to produce an image signal. Numeral 15 denotes an adder circuit which adds transmission signals and supplies a sum signal to the hybrid circuit 4 through the signal line 15a. Numeral 16 denotes a console circuit which operates the apparatus and registers the dialing digit code and the related information. Numeral 17 denotes a CPU which controls the console circuit 16. Numeral 18 denotes a read-only memory (ROM) which contains an operation program of the CPU 17. Numeral 19 denotes a random access memory (RAM) in which the dialing digit code and the related information are stored. Numeral 20 denotes input means which has console switches, ten-key panel and other keys to operate the apparatus and enter the information. Numeral 21 denotes a speech generation circuit. When a speech generation command signal is supplied to the speech generation circuit 21 from the control circuit 1 through a signal line 1f, the speech generation circuit 21 generates a speech signal such as "Depress a receive button" and sends it to the destination equipment through the signal line 21a, adder circuit 15, hybrid circuit 4, NCU 2 and telephone line 2a.

FIG. 2 shows an information content stored in the RAM 19. A denotes an address area, B denotes an area to store telephone numbers and C denotes an area to store various information. In FIG. 2, the telephone numbers are shown in the area B by decimal numbers for the purpose of clear illustration, although they are actually stored by binary numbers. Cl denotes information on presence or absence of a facsimile machine. When C1 is "1", it indicates that the destination station has a facsimile machine, and when it is "0", it indicates that the destination station has no facsimile machine. By virtue of this information, the calling may be effected even if the destination station is a conventional telephone set. C2 denotes information on the data transmission rate. "00" indicates the transmission rate of 9600 b/s, "01" indicates 7200 b/s, "10" indicates 4800 b/s and "11" indicates 2400 b/s. C3 denotes information on the presence or absence of the high quality mode. "1" indicates the image signal transmission in the high quality mode and "0" indicates the transmission in a standard mode.

FIG. 3 is a flow chart of the operation of the control circuit 1. In a step S1, a call counter which counts the number of calls is reset. In a step S2, a flag FAXFLG which indicates whether the destination equipment is a facsimile machine or not is reset. If the FAXFLG is "1", it indicates that the destination equipment is the facsimile machine, and when the FAXFLG is "0", it is not the facsimile machine. In a step S3, the control circuit 1 receives the dialing digit signal from the console circuit 16. In a step S4, a switching command signal is supplied to the NCU 2 so that the telephone line 2a is switched from the telephone set to the facsimile machine. In the step S5, a call command signal is supplied to the calling circuit 6 and the DC circuit of the calling circuit is closed. Three seconds later, a step S6 is initiated in which the dialing digit code is supplied to the calling circuit 6, which sends the dialing digit signal to the telephone network. In a step S7, a 45-second timer is started, and in a step S8, whether the dialing digit code is a registered number or not is checked. If it is the registered number, a step S9 is executed, and if it is not, a step S20 is executed. The calling may be inhibited if the dialing digit code is not the registered number so that misdialing is prevented. In the step S9, the information C1 indicating whether the destination equipment is the facsimile machine or not is read. If C1 is "1", a step S10 is executed, and if C1 is "0", a step S11 is executed. In the step S11, the polarity reversal is checked. If the polarity reversal is detected, a step S15 is executed, and if it is not detected, a step S12 is executed. The phase reversal is detected in the step S11 until the 45-second timer is timed out, and when it is timed out in the step S12, a step S13 is executed. In the step S13, a switching command signal is supplied to the NCU 2 so that the telephone line 2a is switched to the telephone set. In a step S14, a power supply is turned off. If the polarity reversal is detected in the step S11, a step S15 is executed. In the step S15, the speech output command is supplied to the speaker circuit 7 so that the received signal is speech-outputted. In a step S16, a 35-second timer is started. In a step S17, whether a handset of the telephone set 3 is in use or not is checked. If the telephone set 3 is detected as being in use in the step 17, a step S17' is executed, and if it is not detected, a step S18 is executed. In the step S18, the in use is detected until the 35-second timer is timed out, when the step S13 is executed. If the in use is detected in the step S17, the step S17' is executed and the switching command signal is supplied to the NCU 2 so that the telephone line 2a is connected to the telephone set. In a step S19, the telephone communication is effected. The calling may be effected even if the designation equipment is the telephone set.

In the step S9, if C1 is "1", the FAXFLG is set to "1" in the step S10. Then, the step S20 is executed. In the step S20, if the polarity reversal is detected, a step S28 is executed, and if it is not detected, the polarity reversal is detected in a step S21 until the 45-second timer is timed out, when a step S22 is executed. In the step S22, the switching command signal is supplied to the NCU 2 so that the telephone line 2a is connected to the telephone set. Then, a step S23 is executed. In the step S23, the call counter is incremented by one. In a step S24, whether the content of the call counter is equal to 3 or not is checked. If it is equal to 3, the step S27 is executed to turn off the power supply, and if it is not equal to 3, a step S25 is executed to start a one-minute timer. When the one-minute timer is timed out in a step S26, the step S4 is executed again to call the designation station. If the polarity reversal is detected in the step S20, a step S28 is executed to start the 35-second timer. In a step S29, the CNG signal transmission command signal is supplied to the tonal signal circuit 9. In a step S30, the end of the CNG signal transmission is checked, and if it is the end, a step S31 is executed, and if it is not the end, a step S36 is executed. In the step S31, whether the FAXFLG is "0" or not is checked, and if it is "0", a step S32 is executed, and if it is not "0", a step S33 is executed. In the step S32, whether the speech recognition signal has been applied to the control circuit 1 or not is checked, and if it has, a step S44 is executed, and if it has not, a step S33 is executed. In the step S33, whether the CED detection signal has been supplied to the control circuit 1 from the tonal signal circuit 9 or not is checked, and if it has, a step S34 is executed, and if it has not, a step S35 is executed. In the step S34, the FAXFLG is set to "1". In the step S35, whether the NSF, CSI and DIS detection signals have been supplied to the control circuit 1 from the V21 modem 10 or not is checked, and if they have, a step S48 is executed, and if they have not, the step S30 is executed. In the step S30, the end of the CNG transmission is checked. In a step S36, a three-second timer is started. In a step S37, the time-out of the three-second timer is checked, and if it has not been timed out, a step S38 is executed, and if it has, a step S43 is executed. In the step S38, whether the FAXFLG is "0" or not is checked, and if it is "0", a step S39 is executed, and if it is not "0", a step S40 is executed. In the step S39, whether the speech recognition signal has been supplied to the control circuit 1 from the speech detection circuit 8 or not is checked, and if it has, a step S44 is executed, and if it has not, a step S40 is executed. Whether the CED detection signal has been supplied to the control circuit 1 from the tonal signal circuit 9 or not is checked, and if it has, a step S41 is executed to set the FAXFLG to "1" and then execute a step S42, and if it has not, the step S42 is executed.

In the step S42, whether the NSF, CSI and DIS detection signals have been supplied to the control circuit 1 from the V21 modem 10 or not is checked, and if they have, a step S48 is executed, and if they have not, the step S37 is executed. In the step S37, the time-out of the three-second timer is checked, and in the step S43, the time-out of the 35-second timer is checked. If it has been timed out, the step S13 is executed, and if it has not, the step S29 is executed. In the step S29, the speech is recognized. In the step S44, whether a specific speech detection signal has been supplied to the control circuit 1 by the speech detection circuit 8 or not is checked, and if it has, a step S45 is executed, and if it has not, a step S15 is executed. In the step S45, a speech command signal is supplied to the speech generation circuit 21 so that the speech generation circuit 21 sends a speech signal such as "Depress a receive button" to the destination telephone set. In a step S46, the end of the transmission of the speech signal is checked. In a step S47, the FAXFLG is set to "1". Then, the step S29 is executed.

In the step S48, whether the transmission rate of the image signal has been specified or not is checked, and if it has, a step S49 is executed to enter the specified rate information C2 and then a step S50 is executed, and if it has not, a step S51 is executed. In the step S50, whether the communication with the destination equipment at the specified transmission rate is permitted or not is checked, and if it is permitted, a step S50' is executed to enter the information on the specified rate to the FIF field of the DCS signal and then a step S56 is executed, and if the communication is not permitted, a step S51 is executed. In the step S51, whether the transmission of the image signal by the V29 modem is permitted or not is checked, and if it is permitted, a step S52 is executed. In the step S52, the rate information of 9600 b/s is inputted to the FIF field of the DCS signal. In a step S56, if the V29 model is unavailable, a step S53 is executed. In the step S53, whether the transmission of the image signal by the V27 ter model is permitted or not is checked, and if it is permitted, the 4800 b/s is declared in a step S54 and then a step S56 is executed. If the V27 ter modem is unavailable, the 2400 b/s is declared in a step S55 and then the step S56 is executed. The declarations of 4800 b/s and 2400 b/s are done in the same manner as that of the 9600 b/s. In the step S56, whether the high quality mode selection information C3 has been supplied to select the high quality mode or not is checked, and if it has, a step S57 is executed, and if it has not, a step S59 is executed.

In the step S57, whether the communication with the destination equipment in the high quality mode is permitted or not is checked, and if it is permitted, a step S60 is executed to declare the high quality mode and then a step S61 is executed. If it is not permitted, a step S58 is executed to declare the standard mode and a step S61 is executed. The declarations of the high quality mode and the standard mode are done by inputting the high quality mode information and the standard mode information to the FIF field of the DCS signal. In the step S59, whether a switch on a panel (not shown) selects the high quality mode or not is checked, and if it does, a step S57 is executed, and if it does not, a step S58 is executed. In the step S61, the NSS, TSI and DCS transmission command signals are supplied to the V21 modem 10 so that the NSS, TSI and DCS signals are sent to the destination equipment. In a step S62, the image signal is transmitted.

Since an operator can set any transmission rate, the operator may set a low speed mode where the condition of the telephone line is statistically bad and the fall-back occurs frequently so that uncertain fall-back is avoided. By presetting the transmission rate, the protocol time can be reduced.

The CPU 17 may be programmed such that whether the dialing digit code entered by the ten-key of the facsimile machine is the registered dialing digit code or not is checked. Thus, when the dialing digit code is inputted by the ten-key, the above communication control is effected by the registered information corresponding to the dialing digit code.

If the destination telephone set is busy, it is called again one minute later. The wait time may be arbitrarily set by the operator.

In addition to the registered information described above, other information such as communication control information may be registered.

In accordance with the first embodiment, the operator can set any mode in accordance with the destination station. Thus, by presetting the mode, the communication time can be reduced.

A second embodiment in which the communication protocol is simplified by the information of the destination station stored during the first communication protocol and the switching control of the modem is explained.

FIG. 5 is a block diagram showing an overall configuration of the second embodiment. Numeral 51 denotes a central control circuit which control a facsimile communication apparatus. It comprises a microcomputer and peripheral devices such a ROM and a RAM. Numeral 52 denotes a network control unit NCU which switches the connection of a telephone line a between a telephone set 53 or a facsimile machine by a switching command signal supplied from the central control circuit 51 through a signal line c. Numeral 54 denotes a tonal signal circuit which detects and sends a tonal signal. Numeral 55 denotes a selection circuit which selects a control signal modem 56 or an image signal modem 57 by a modem selection command signal supplied from the central control device 51 through a signal line f. When the selection circuit 55 receives a 300 b/s binary signal or image signal, it sets a signal line SED to an H-level, and when it does not receive the 300 b/s binary signal or image signal, it sets the signal line SED to an L-level. The control signal modem 56 modulates and demodulates the 300 b/s binary signal and the image signal modem 57 modulates and demodulates the image signal and an EOP signal which is transmitted at the same speed as the image signal. When the image signal modem 57 receives the image signal, it sets a signal line CD to the H-level, and when it does not receive the image signal, it sets the signal line CD to the L-level. When the image signal modem 57 receives the 300 b/s binary signal, it sets a signal line FAIL to the H-level, and when it does not receive the binary signal, it sets the signal line FAIL to the L level. Numeral 58 denotes a read circuit to read a document. Numeral 59 denotes a recorder which records the received image signal and copies the document.

Numeral 60 denotes a memory which stores a control program for the central control circuit 51 and information on the facsimile communication.

Figure 6A:
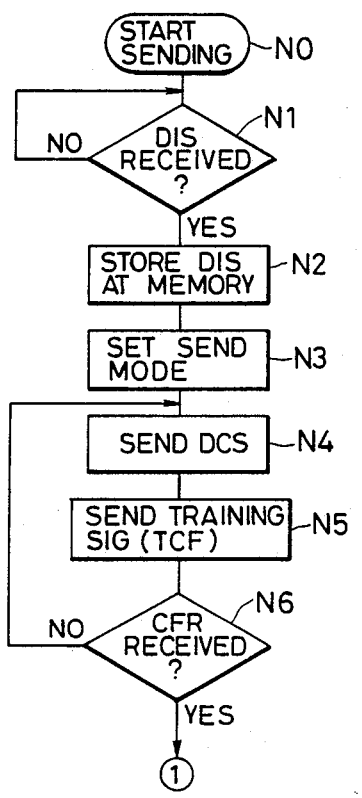
FIG. 6 is a flow chart in a sending station in the second embodiment.
Figure 6B:
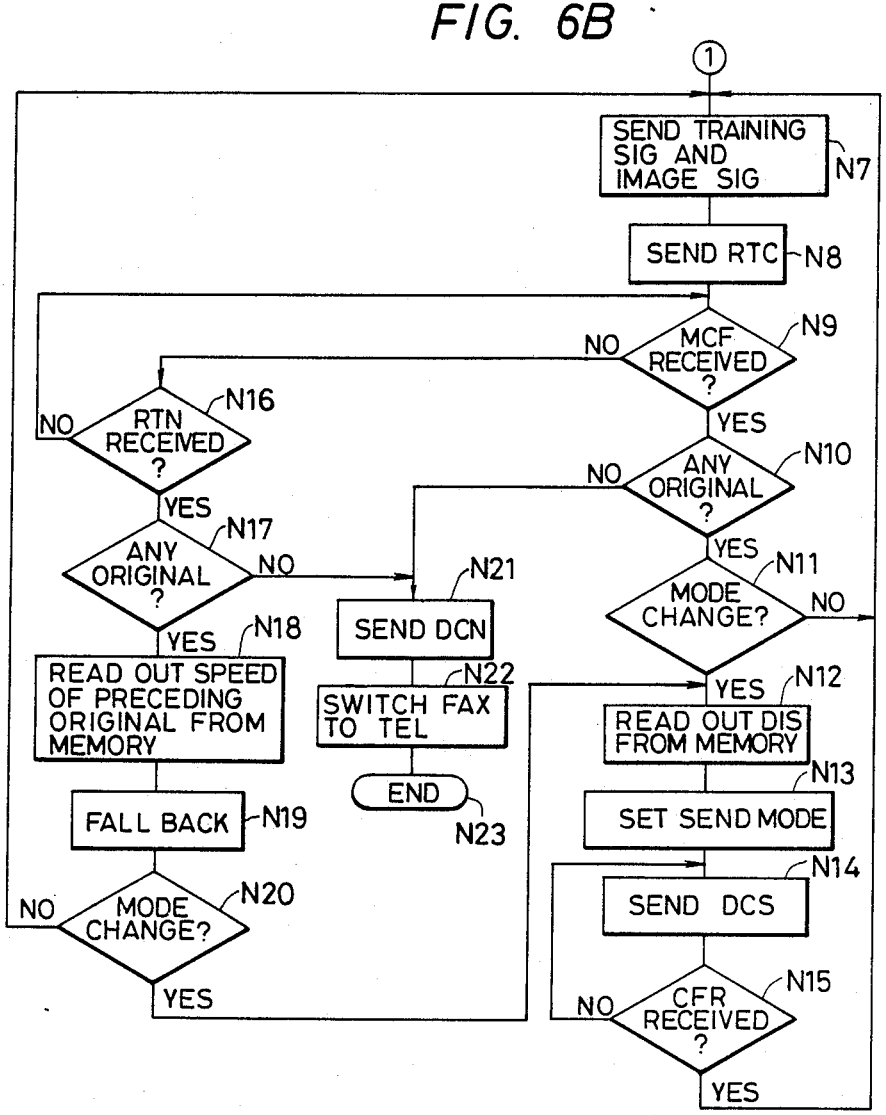
Figure 7A:
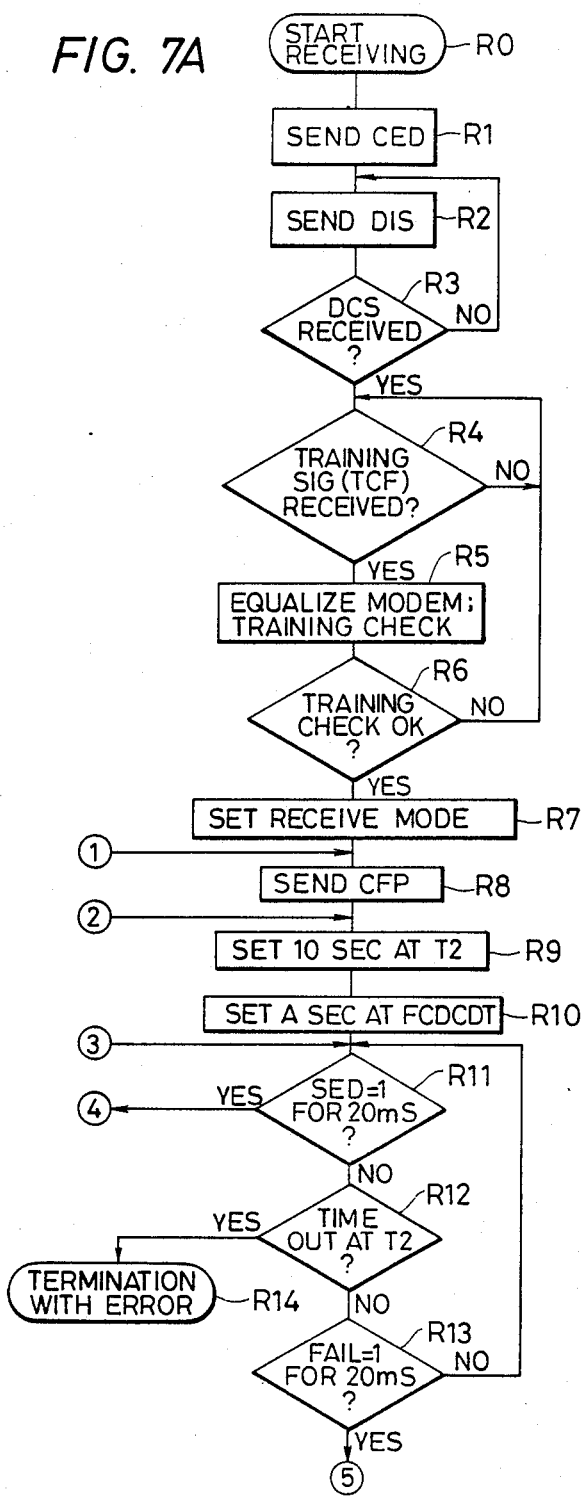
FIG. 7 is a flow chart in a sending station in the second embodiment.
Figure 7B:
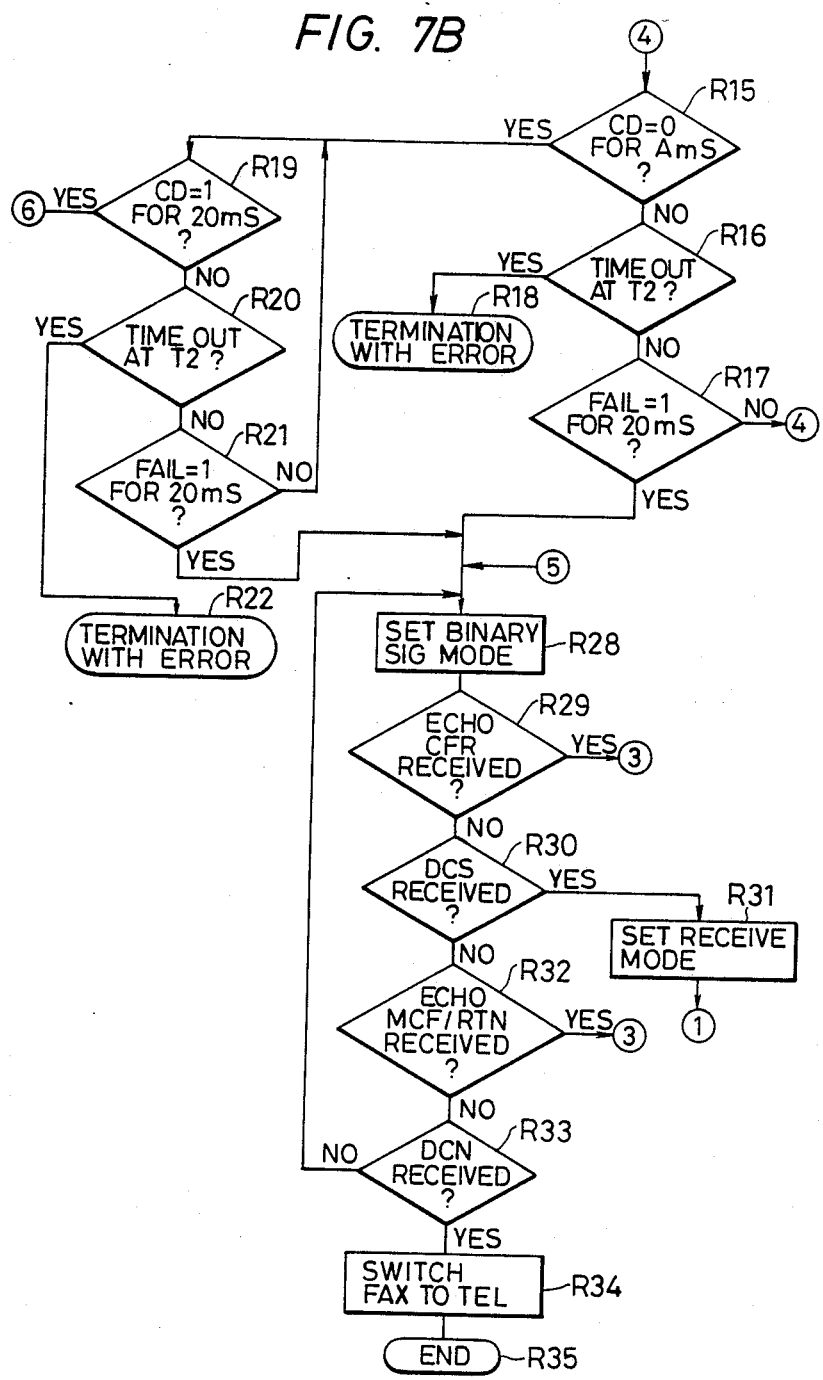
Figure 7C:
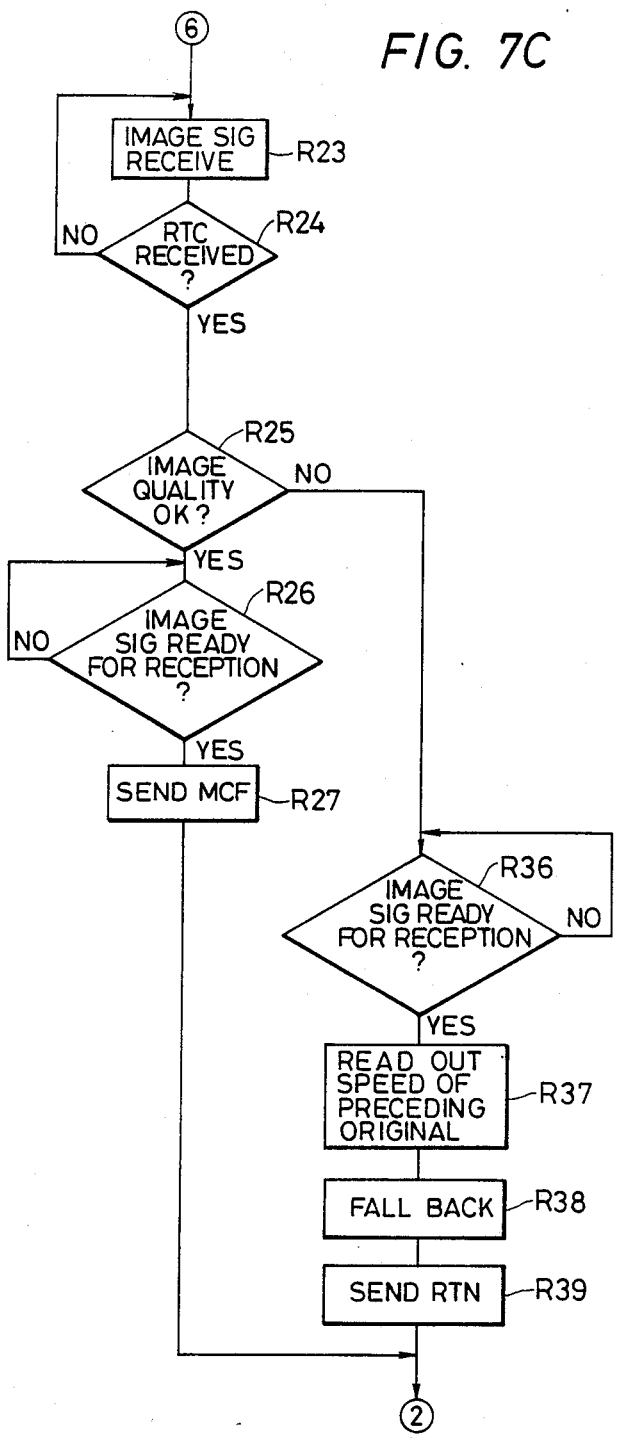

FIGS. 6 and 7 show the control operations of the central control circuit 51. FIG. 6 is a flow chart in a sending station and FIG. 7 is a flow chart in a receiving station.

The control operation in the sending station is first explained. In a step N0 of FIG. 6, the transmission is started. In a step N1, the reception of the DIS signal is checked, and if it is received, a step N2 is executed. In the step N2, the DIS signal is stored in the memory 60. In a step N3, a transmission mode is set. In a step N4, the DCS signal is sent. In a step N5, a training signal and a TCF signal are sent. In a step N6, the reception of a CFR signal is checked, and the steps N4, N5 and N6 are repeated until the CFR signal is received. When the CFR signal is received, a step N7 is executed. The above is a pre-protocol from the start of transmission to the transmission of the first image signal.

In the step N6, if the reception of the CFR signal is detected, a step N7 is executed. In the step N7, the training signal is first sent. Then, the image signal is sent. After one document of image signal has been sent, a step N8 is executed to send the RTC signal. In a step N9, the reception of the MCF signal is checked, and if it has not been received, a step N16 is executed. In the step N16, the reception of the RTN signal is checked, and if it has not been received, the step N9 is executed, and if it has been received, a step N17 is executed. The steps N9 and N16 are repeated until the MCF or RTN signal is received. In the step N9, if the reception of the MCF signal is detected, a step N10 is executed. In the step N10, the presence or absence of the next document is checked, and if the next document exists, a step N11 is executed, and if it does not exist, a step N21 is executed. In the step N11, the mode change is checked. If it is the mode change, a step N12 is executed to read the DIS signal from the memory 60. In a step N13, the transmission mode is set. In a step N14, the DCS signal is sent. In a step N15, the reception of the CFR signal is checked. The steps N14 and N15 are repeated until the CFR signal is received, when the step N7 is executed to send the image signal.

If the mode change is not detected in the step N11, the step N7 is executed to send the image signal. In the step N16, the reception of the RTN signal is checked. In the step N17, the presence or absence of the next document is checked. If the next document exists, a step N18 is executed, and if it does not exist, a step N21 is executed. In the step N18, the transmission rate for the previous document is read from the memory 60. In a step N19, the fall-back is effected and a step N20 is executed. In the step N20, the mode change is checked, and if it is not the mode change, the step N7 is executed to send the image signal, and if it is the mode change, a step N12 is executed.

In the steps N10 and N17, if the next document does not exist, a step N21 is executed to send the DCN signal. In a step N22, the telephone line a is switched to the telephone set from the facsimile machine. In a step N23, the transmission is terminated.

The control operation in the receiving station is now explained. In a step R0 of FIG. 7, the reception is started. In a step R1, the CED signal is sent. In a step R2, the DIS signal is sent. In a step R3, the receipt of the DCS signal is checked. The steps R2 and R3 are repeated until the DCS signal is received, when a step R4 is executed. In the step R4, the reception of the training signal and the TCF signal are checked, and if they are received, a step R5 is executed. In the step R5, the equalization of the modem and the training is checked. In a step R6, if the training check is OK, a step R7 is executed. If it is not OK, the step R4 is executed. In the step R7, the reception mode is set. In a step R8, the CFR signal is sent. In a step R9, a "10 seconds" is set to a software register T2. In a step R10, "Ams" is set in a software register FCDCDT, where A is a training signal transmission time received immediately before the image signal in the respective transmission rates (e.g. 9600 b/s, 7200 b/s, 4800 b/s and 2400 b/s). It is recommended by the T.30 Recommendation as follows.

For 9600 b/s: A=253 ms
For 7200 b/s: A=253 ms
For 4800 b/s: A=913−933 ms
For 2400 b/s: A=1149−1169 ms

In a step R11, whether the signal line SED is in the H-level continuously for 20 ms or not is checked. If the signal line SED is H-level, a step R15 is executed, and if it is L-level, a step R12 is executed. In the step R12, whether T2 has been timed out or not is checked, and if it has been timed out, a step R14 is executed to terminate the process with error, and if it has not been timed out, a step R13 is executed. In the step R13, whether the signal line FAIL is in the H-level continuously for 20 ms or not is checked, and if it is H-level, a step R28 is executed, and if it is L-level, the step R11 is executed. In the step R15, whether or not the signal line CD is in the L-level continuously for A ms which was set in the FCDCDT is checked, and if the line CD is L-level, a step R19 is executed, and if it is H-level, a step R16 is executed. In the step R16, whether T2 has been timed out or not is checked, and if it has been timed out, a step R18 is executed to terminate the process with error, and if it has not been timed out, a step R17 is executed. In the step R17, whether the line FAIL is in the H-level continuously for 20 ms or not is checked, and if it is H-level, a step R28 is executed, and if it is L-level, the step R15 is executed. In the step R15, if the line CD is L-level, a step R19 is executed. In the step R19, whether the line CD is in the H-level continuously for 20 ms or not is checked, and if the line CD is H-level, a step R23 is executed, and if it is L-level, a step R20 is executed.

In the step R20, whether T2 has been timed out or not is checked, and if it has been timed out, a step R22 is executed to terminate the process with error, and if it has not been timed out, a step R21 is executed. In the step R21, whether the line FAIL is in the H-level continuously for 20 ms or not is checked, and if the line FAIL is H-level, a step R28 is executed, and if it is L-level, the step R19 is executed. In the step R19, the CD line is H-level and a step R23 is executed. In the step R23, the image signal is received until the RTC signal is received in a step R24. When the RTC signal is received in the step R24, a step R25 is executed to check an image quality. If the image quality is high, a step R26 is executed, and if it is low, a step R36 is executed. In the step R26, whether the reception of the image signal is ready or not is checked, and if it is ready, a step R27 is executed to send the MCF signal and the step R9 is executed to receive the next document.

If the image quality is low in the step R25, the step R36 is executed to check if the reception of the image signal is ready or not. If it is ready, a step R37 is executed. In the step R37, the transmission rate of the previous document is read from the memory 60. In a step R38, the fall-back is effected. In a step R39, the RTN signal is sent and the step R9 is executed to receive the next document.

In the steps R13, R17 and R21, if the line FAIL is H-level, the step R28 is executed. In the step R28, the 300 b/s binary signal reception mode is set. In a step R29, whether an echo CFR signal (the CFR signal sent by the receiving station, reflected and received by the receiving station facsimile machine) has been received or not is checked, and if it has, the step R11 is executed, and if it has not, a step R30 is executed. In the step R30, whether the DCS signal has been received or not is checked, and if it has, a step R31 is executed to set the reception mode, and the step R8 is executed to receive the next document. If the DCS signal has not been received in the step R30, a step R32 is executed. In the step R32, whether an echo MCF/RTN signal (the MCF/RTF signal transmitted by the receiving station, reflected and received by the receiving station facsimile machine) has been received or not. If it has been received, the step R11 is executed, and if it has not been received, a step R33 is executed. In the step R33, whether the DCN signal has been received or not is checked, and if it has not been received, the step R28 is executed, and if it has been received, a step R34 is executed. In the step R34, the telephone line is switched from the facsimile machine to the telephone set. In a step R35, the reception is terminated.

FIGS. 8A–8D show communication protocols without mode change, with mode change, a protocol after the last document and a protocol in the transmission rate fall-back, respectively, in the multi-page transmission and reception in accordance with the present embodiment.

Figure 4A:
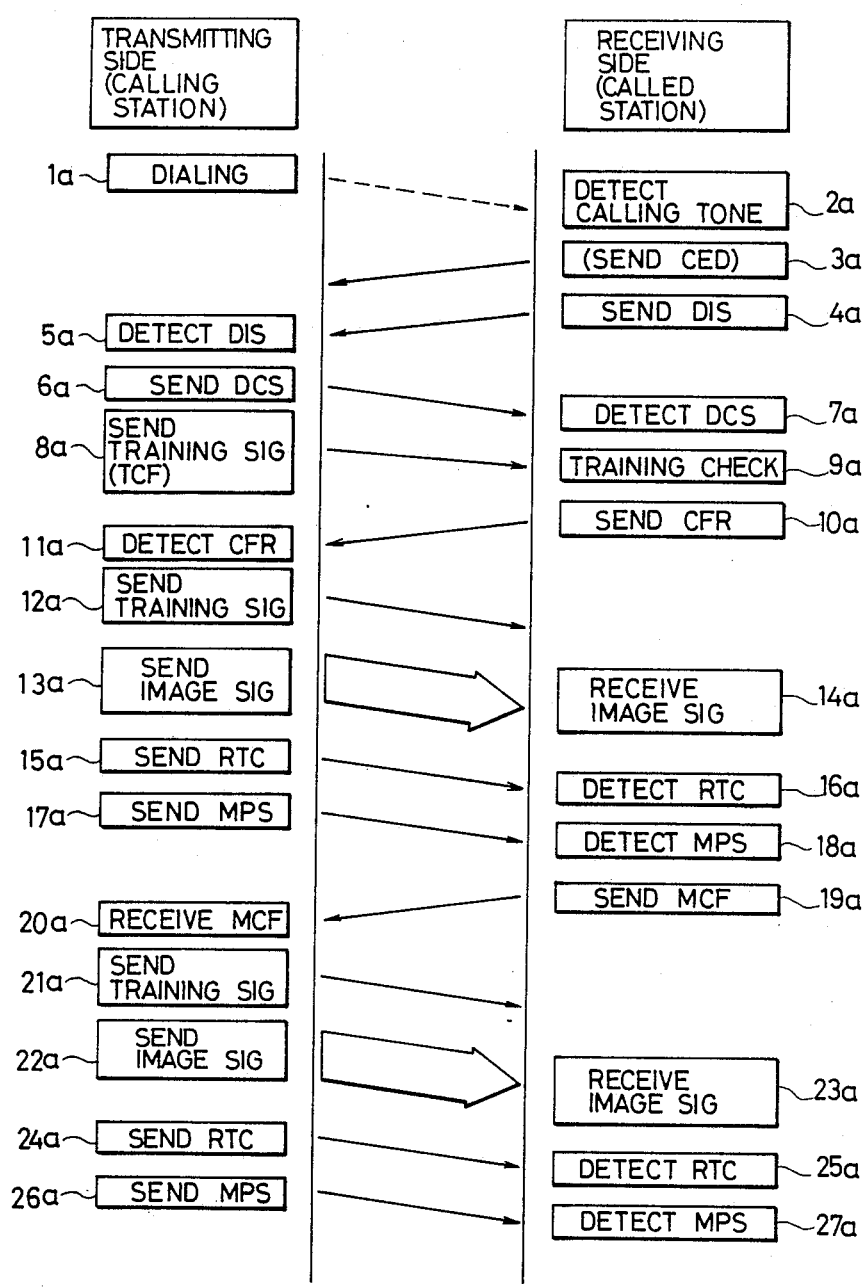
FIG. 4A shows a multi-page protocol sequence without a mode change in accordance with the conventional T.30 Recommendation.
Figure 4B:
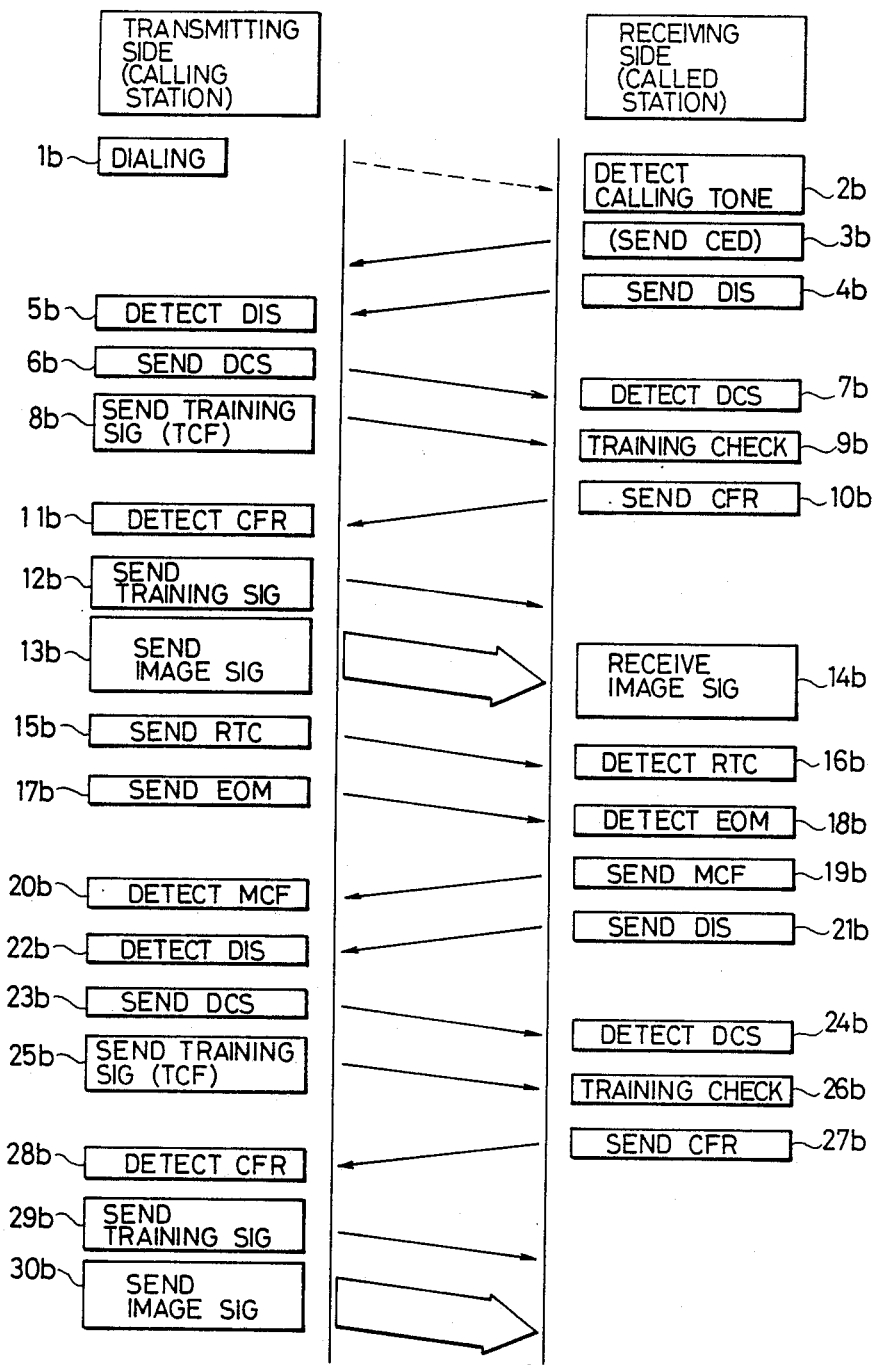
FIG. 4B shows a multi-page protocol sequence with a mode change in accordance with the conventional T.30 Recommendation.
Figure 4C:
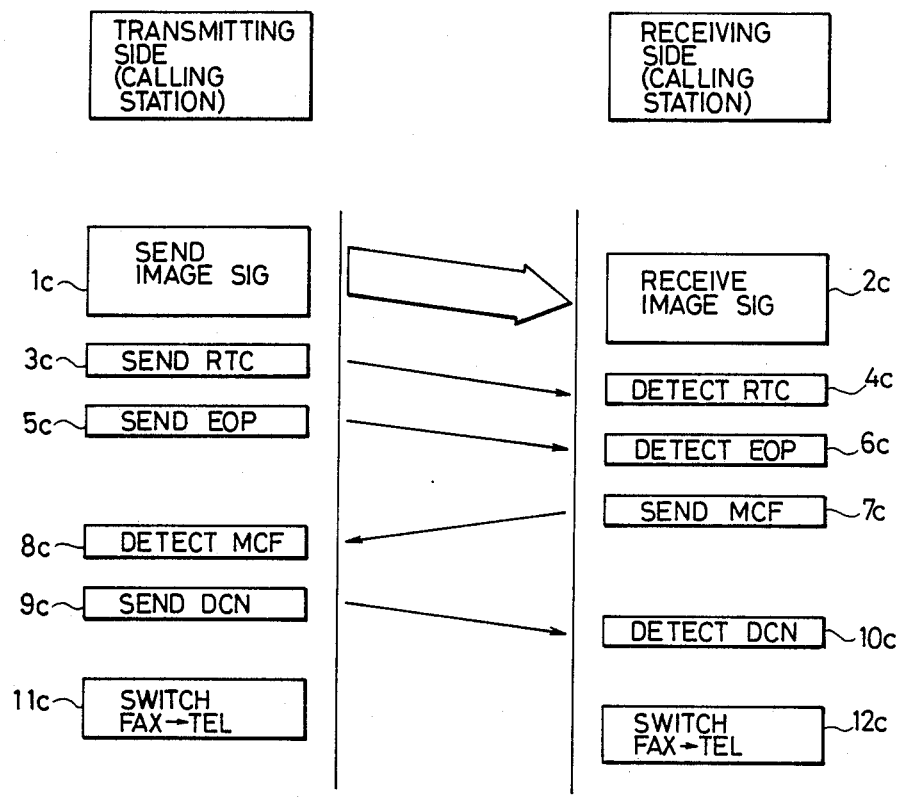
FIG. 4C shows a protocol sequence after a last document in accordance with the conventional T.30 Recommendation.
Figure 4D:
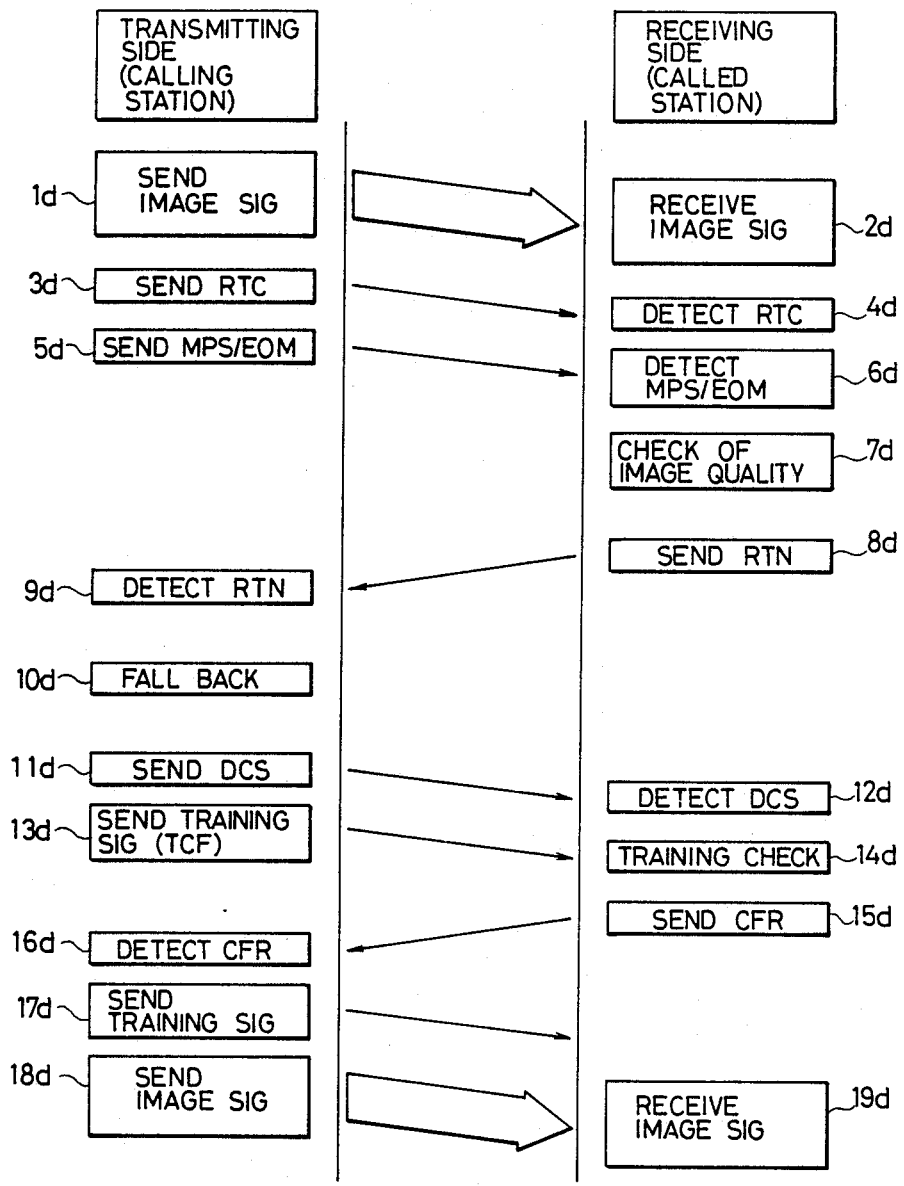
FIG. 4D shows a protocol in a transmission speed fall-back in accordance with the conventional T.30 Recommendation.
Figure 8A:
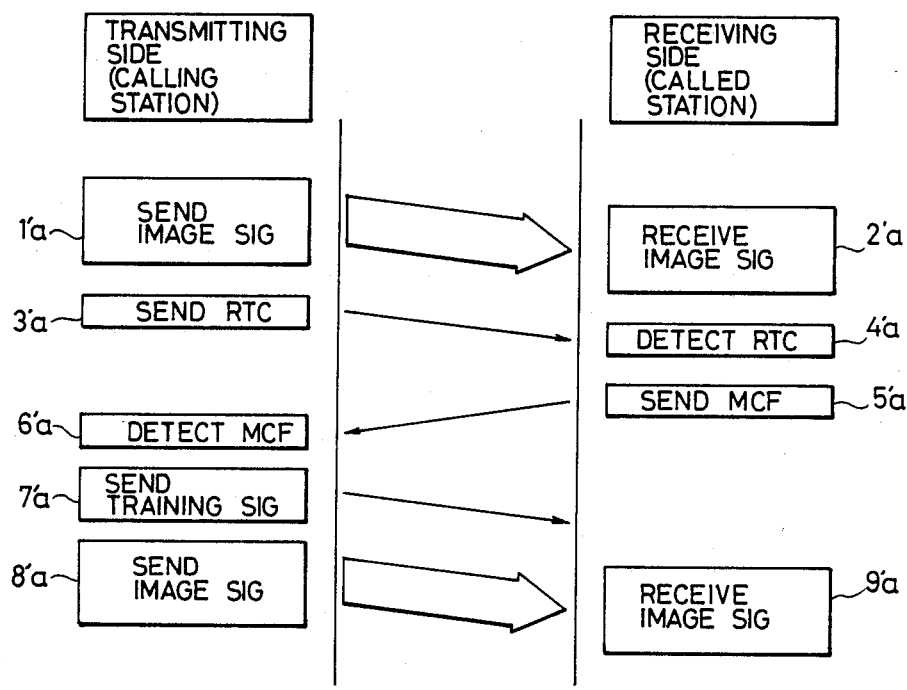
FIG. 8A shows a sequence without a mode change in the second embodiment.

FIG. 8A shows the communication protocol without mode change. The protocol before the transmission ($1'a$) of the first document image signal is same as that of the steps 1a–12a in FIG. 4A. It corresponds to the step N7 in FIG. 6 and the step R11 in FIG. 7. The training signal is received in the step R11, and the L-level of the line CD is detected in the step R15, and the steps R19, R20 and R21 are repeated until the image signal is received.

As the first document image signal is transmitted ($1'a$ in FIG. 8A), the H-level of the line CD is detected in the step R19. In the step R23, the image signal is received ($2'a$ of FIG. 8A). When the sending station completes the transmission of the first document image signal, it sends the RTC signal ($3'a$ in FIG. 8A). When the receiving station receives the RTC signal ($4'a$ in FIG. 8A), the image quality is checked in the step R25 of FIG. 7, the ready status for the reception is checked in the step R26, and the MCF signal is sent in the step R27 ($5'a$ in FIG. 8A). The sending station now repeats the steps N9 and N16, and when it receives the MCF signal ($6'a$ in FIG. 8A), the presence or absence of the next document is checked in the step N10, the mode change is checked in the step N11, the training signal is sent in the step N7 ($7'a$ in FIG. 8A) and the image signal is sent ($8'a$ in FIG. 8A). Thus, since the control signal modem 56 is selected in the protocol between the documents and the 300 b/s binary signal is not received, the transmission and reception of the MPS signal can be omitted and the protocol time is reduced.

Figure 8B:
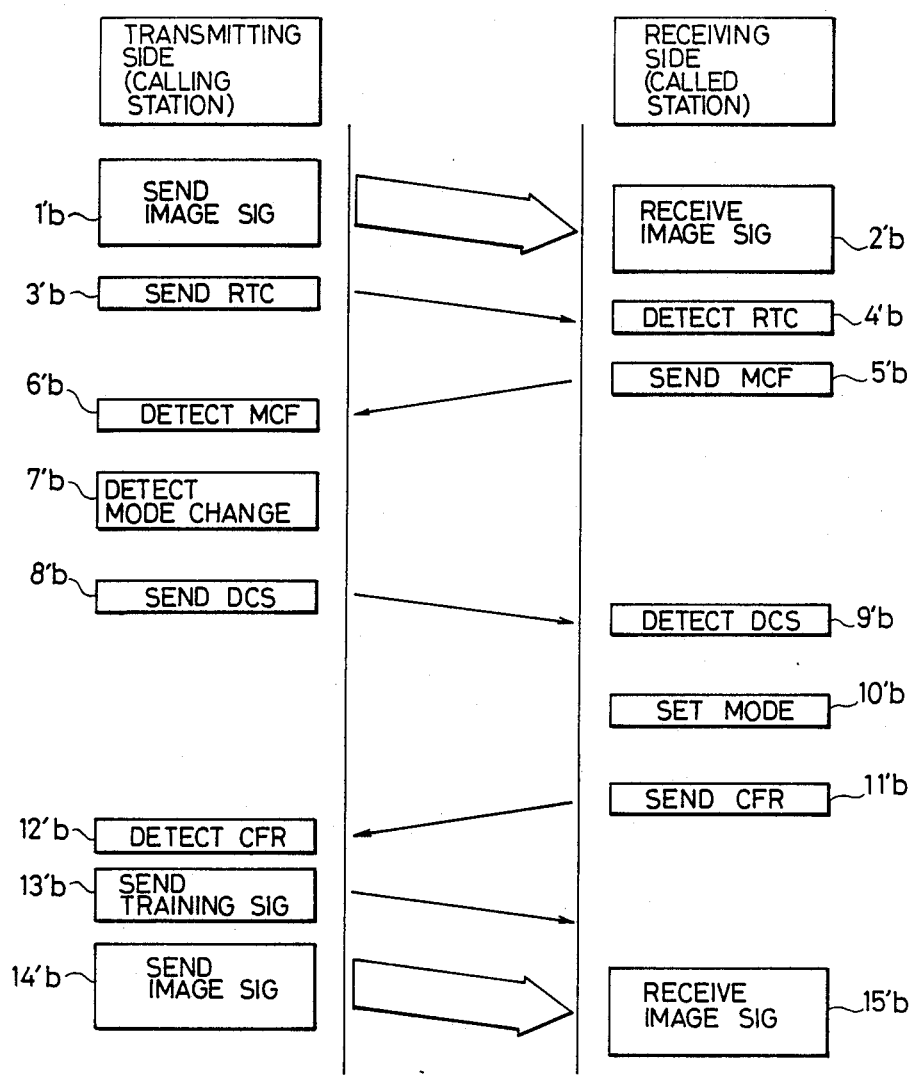
FIG. 8B shows a sequence with a mode change in the second embodiment.

FIG. 8B shows a communication protocol with mode change. The transmission rate mode and the high quality mode are changed by an operator.

In FIG. 8B, the steps to the reception of the MCF signal ($6'b$) are equal to those to the reception of the MCF signal ($6'a$) in FIG. 8A. It corresponds to the step N11 of FIG. 6 in the sending station and the step R9 of FIG. 7 in the receiving station.

The sending station detects the mode change in the step N11 of FIG. 6 (7'b in FIG. 8B) and sends the DCS signal (8'b in FIG. 8B) in the steps N12, N13 and N14 of FIG. 6. The receiving station receives the DCS signal in the steps R9, R10 and R11 of FIG. 7, detects the H-level of the line FAIL in the steps R11, R15, R19, R20 and R21, checks the reception of the DCS signal in the steps R28, R29 and R30 (9'b in FIG. 8B), sets the reception mode in the step R31 (10'b in FIG. 8B) and sends the CFR signal in the step R8 (11'b in FIG. 8B).

The receiving station receives the CFR signal in the step N15 of FIG. 6 (12'b in FIG. 8B), sends the training signal (13'b in FIG. 8B) and sends the image signal (14'b in FIG. 8B).

In this manner, the transmission and reception of the EOM signal can be omitted. By setting the mode in the receiving station, the training signal and the TCF signal may be omitted.

Figure 8C:
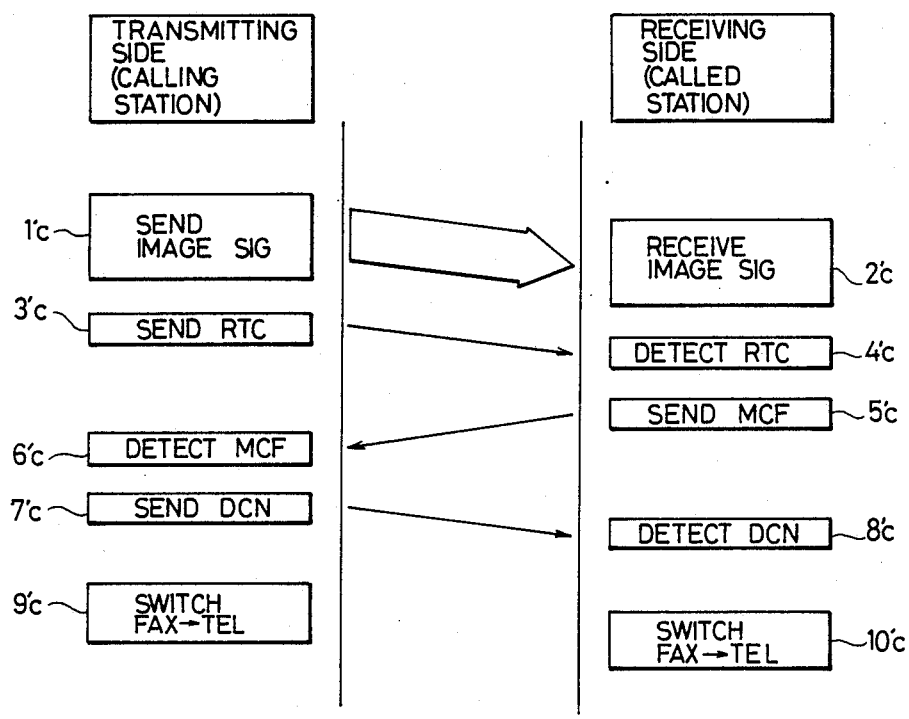
FIG. 8C shows a communication protocol sequence after a last document in the second embodiment.

FIG. 8C shows a communication protocol after the last document. The steps to the reception of the MCF signal (6'c) in FIG. 8C are same as those to the reception of the MCF signal in FIG. 8A. It corresponds to the step N10 in FIG. 6 in the sending station and the step R9 in FIG. 7 in the receiving station.

The sending station checks the presence or absence of the next document in the step N10 of FIG. 6. Since it is after the last document, the step N21 is executed to send the DCN signal (7'c in FIG. 8C). In the step N22, the telephone line is switched from the facsimile machine to the telephone set (9'c in FIG. 8C) and the communication is terminated.

The receiving station executes the steps R9, R10 and R11 of FIG. 7, and since it received the DCN signal, it executes the steps R15, R19, R20, R21, R28, R29, R30, R32 and R33 to check the reception of the DCN signal (8'c in FIG. 8C). In the step R34, the telephone line is switched from the facsimile machine to the telephone set (10'c in FIG. 8C) and the communication is terminated.

In this manner, the transmission and reception of the EOP signal can be omitted.

Figure 8D:
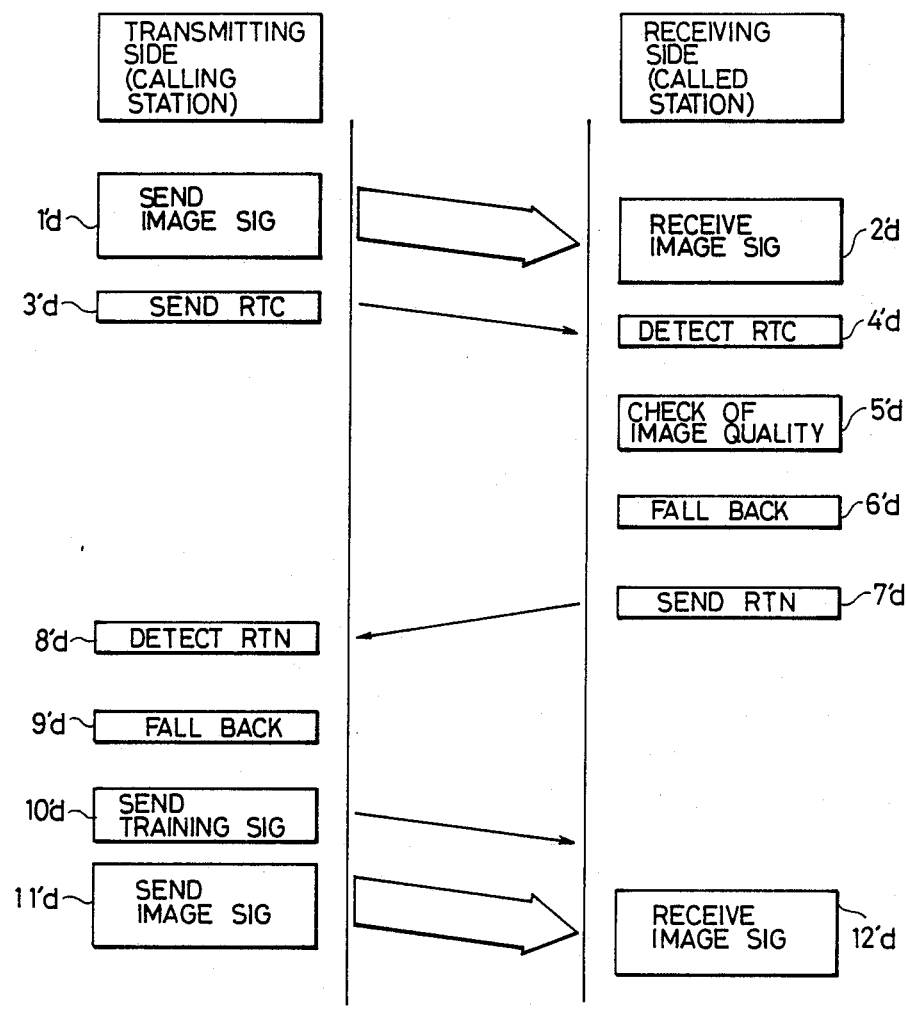
FIG. 8D shows a communication protocol sequence in a transmission speed fall-back in the second embodiment.

FIG. 8D shows a communication protocol in the transmission rate fall-back. The steps to the reception of the RTC signal (4'd) in FIG. 8D are same as those to the reception of the RTC signal (4'a) in FIG. 8A. The sending station repeats the steps N9 and N16 and the receiving station is in the step R25.

The receiving station checks the image quality in the step R25 of FIG. 7 (5'd in FIG. 8D), and since the image quality is low, it executes the steps R36, R37 and R38 to effect the fall-back (6'd in FIG. 8D) and sends the RTN signal in the step R39 (7'd in FIG. 8D).

The sending station checks the reception of the RTN signal in the step N16 of FIG. 6 (8'd in FIG. 8D) and executes the steps N17, N18 and N19 to effect the fall-back (9'd in FIG. 8D). Then, it executes the steps N20 and N17 to send the training signal (10'd in FIG. 8D) and send the image signal (11'd in FIG. 8D).

In this manner, the transmission and reception of the MPS or EOM signal can be omitted. Since the fall-back is effected in the sending station and the receiving station by the DIS signal stored in the memory 60, the transmission and reception of the DCS, training, TCF and CFR signals can be omitted.

Thus, since the modem of the facsimile machine is switched to the image signal modem 57 after the pre-protocol of the communication and switched to the control signal modem 56 only when the 300 b/s binary signal is received, the MPS, EOM and EOP control signals can be omitted and the image communication protocol can be simplified.

In accordance with the second embodiment of the present invention, the image communication protcol time is reduced and the image communication cost is reduced.

In the first and second embodiment, the facsimile machine for communicating the image data was explained. The present invention is not limited to the facsimile machine but it may be applied to any data communication apparatus such as a telex machine for communicating character code data.

We claim:

1. A data communication apparatus comprising:
    means for generating any of a plurality of selection signals for respectively indicating different stations to be called;
    first memory means for storing a plurality of calling signal data for the stations to be called;
    second memory means for storing indications as to whether apparatus at each station to be called is a first type or a second type, said first type including speech communication apparatus;
    communication means for communicating with the apparatus in a called station, said communication means having a first communication mode for communicating with apparatus of the first type and a second communication mode for communicating with apparatus of the second type;
    calling means; and
    control means operative in response to one of said generated selection signals (a) to read the respective calling signal data from the first memory means, (b) to cause the calling means to transmit the calling signal data on a communication line, (c) to read the respective apparatus type from the second memory means, and (d) to select the respective communication mode of the communication means in response to the read-out respective apparatus type.

2. An apparatus according to claim 1, wherein said control means discriminates whether the calling signal data corresponding to said generated selection signal is stored in said first memory means.

3. An apparatus according to claim 1, wherein said apparatus of the second type is a data communication apparatus.

4. An apparatus according to claim 1, wherein said selection signal generating means is an abbreviated dialing key.

5. A data communication apparatus comprising:
    means for generating any of a plurality of selection signals for respectively indicating different stations to be called;
    first memory means for storing a plurality of calling signal data for the stations to be called;
    second memory means for storing indications as to whether apparatus at each station to be called is a first type or a second type, said first type and said second type being different in communication data type from each other;
    communication means for communicating with the apparatus in a called station, said communication means having a first communication mode for communicating with apparatus of the first type and a second communication mode for communicating with apparatus of the second type;

calling means; and control means operable in response to one of said generated selection signals (a) to read the respective calling signal data from the first memory means, (b) to cause the calling means to transmit the calling signal data on a communication line, (c) to read the respective apparatus type from the second memory means and (d) to select a respective communication mode of the communication means in response to the read-out respective apparatus type.

6. A data communication apparatus comprising:

first modem means for modulating and demodulating an image signal and for outputting a specific signal in response to receiving a control signal from a destination station during communication through said first modem means;

second modem means for modulating and demodulating the control signal for a communication protocol; and control means for selecting said first modem means or said second modem means and for receiving and/or sending signals through the selected modem means;

wherein when said first modem modes receives a control signal from a destination station during communication through said first modem means, said control means detects reception of the control signal on the basis of said specific signal from said first modem means, and selects said second modem means, and wherein said second modem means demodulates the control signal received by said first modem means and said control means identifies the demodulated control signal.

7. A data communication apparatus according to claim 6, wherein said control means sends a confirmation signal through said second modem means upon completion of receiving an image signal of one page by said first modem means, and thereby does not receive the specific control signal upon the end of reception of the image signal of one page.

8. A data communication apparatus according to claim 7, wherein the predetermined control signal is a protocol signal indicating that data is to be continued and a communication mode is to be changed.

9. A data communication apparatus according to claim 7, wherein the predetermined control signal is a protocol signal indicating that data communication is to be ended.

10. A data communication apparatus comprising:

means for effecting procedures for a data communication protocol to set a mode for communication with a called station;

means for conducting data communication in the mode set by said procedure effecting means;

means for storing information relating to a function of a called station, said information being sent from the called station in effecting procedures for a data communication protocol;

means for instructing a change of the mode for communication with a called station; and means for changing the mode for communication with a called station on the basis of the information relating to a function of a called station stored in said storing means when said instruction means instructs a change of the mode during data communication through said data communication means, said mode changing means indicating a change of the mode to the called station through said procedure effecting means, and wherein when said data communication conducting means completes transmission of data on one page, said mode changing means discriminates whether the change of the mode instructed by said instructing means is allowable or not on the basis of the information relating to a function of a called station stored in said storage means, and if said mode changing means discriminates that the change of the mode is allowable, said mode changing means changes the mode for communication with a called station, whereby simplifying procedures for a data communication protocol in changing the mode is effected.

11. A data communication apparatus comprising:

means for effecting procedures for a data communication protocol to set a mode for communication with a called station;

means for conducting data communication in the mode set by said procedure effecting means;

means for storing information relating to a function of a called station, said information being sent from the called station in effecting procedures for a data communication protocol;

means for instructing a change of the mode for communication with a called station; and means for changing the mode for communication with a called station on the basis of the information relating to a function of a called station stored in said storing means when said instruction means instructs a change of the mode during data communication through said data communication means, said mode changing means indicating a change of the mode to the called station through said procedure effecting means, and wherein said data communication means carries out communication of the image data and said mode changing means changes the density of the image data, whereby simplifying procedures for a data communication protocol in changing the mode is effected.

* * * * *

UNITED STATES PATENT AND TRADEMARK OFFICE
CERTIFICATE OF CORRECTION

PATENT NO. : 4,910,506

DATED : March 20, 1990

INVENTOR(S) : TAKEHIRO YOSHIDA, ET AL.

It is certified that error appears in the above-identified patent and that said Letters Patent is hereby corrected as shown below:

Title Page:
AT [56] REFERENCES CITED

U.S. Patent Documents
        "Veno" should read --Ueno--.

COLUMN 7

Line 3, "step 17," should read --step S17,--.

COLUMN 8

Line 37, "V29 model" should read --V29 modem--.
    Line 39, "V27 ter model" should read --V27 ter modem--.

COLUMN 15 line 25, "first modem modes" should read --first modem means--.

Signed and Sealed this

Eleventh Day of August, 1992

Attest:

DOUGLAS B. COMER

Attesting Officer      Acting Commissioner of Patents and Trademarks